United States Patent [19]

Little

[11] 4,251,082
[45] Feb. 17, 1981

[54] JOINT SEAL HAVING FORCE TRANSFER RING

[75] Inventor: William E. Little, Tremont, Ill.

[73] Assignee: Caterpillar Tractor Co., Peoria, Ill.

[21] Appl. No.: 142,207

[22] PCT Filed: Jan. 21, 1980

[86] PCT No.: PCT/US80/0056
§ 371 Date: Jan. 21, 1980
§ 102(e) Date: Jan. 21, 1980

[51] Int. Cl.³ .................. F16J 15/32; F16J 15/36
[52] U.S. Cl. .................................. 277/87; 277/95; 277/152; 277/166; 277/181; 305/11
[58] Field of Search .............. 277/81 R, 84, 85, 87, 277/92, 186, 95, 152, 166, 153, 165, 181, 38–43, 182; 305/11–13

[56] References Cited
U.S. PATENT DOCUMENTS

| 2,819,106 | 1/1958 | Voorhees | 277/182 |
| 3,061,320 | 10/1962 | Haensch | 277/84 X |
| 3,110,097 | 11/1963 | Yocum | 277/95 X |
| 3,614,113 | 10/1971 | Burk | 305/11 X |
| 3,752,543 | 8/1973 | Schmidt | 277/95 X |
| 3,841,718 | 10/1974 | Reinsma | 277/206 X |
| 4,058,322 | 11/1977 | Fass | 305/11 X |

Primary Examiner—Robert S. Ward, Jr.
Attorney, Agent, or Firm—Wegner, Stellman, McCord, Wiles & Wood

[57] ABSTRACT

A joint sealing structure (16) providing a seal between variably spaced joint members (11,12). The sealing structure includes a seal element (17) having a lip portion (20) engaging a sealing surface (21) of one of the joint members (12) and a base portion (19) having a dynamic sealing engagement with the other of the joint members (11). The lip portion is carried on a flexible mounting portion (18). A Belleville spring (24) applies a sealing force to the lip portion (20) through a stiffener ring (23) held against the seal element solely by the force of the spring without the need for bonding or other fastening means. The stiffener ring may embrace a portion (22) of the seal element which, in the illustrated embodiment, comprises a corner portion thereof. A portion (26) of the stiffener ring may be axially aligned with the lip portion (20) of the seal element.

22 Claims, 7 Drawing Figures

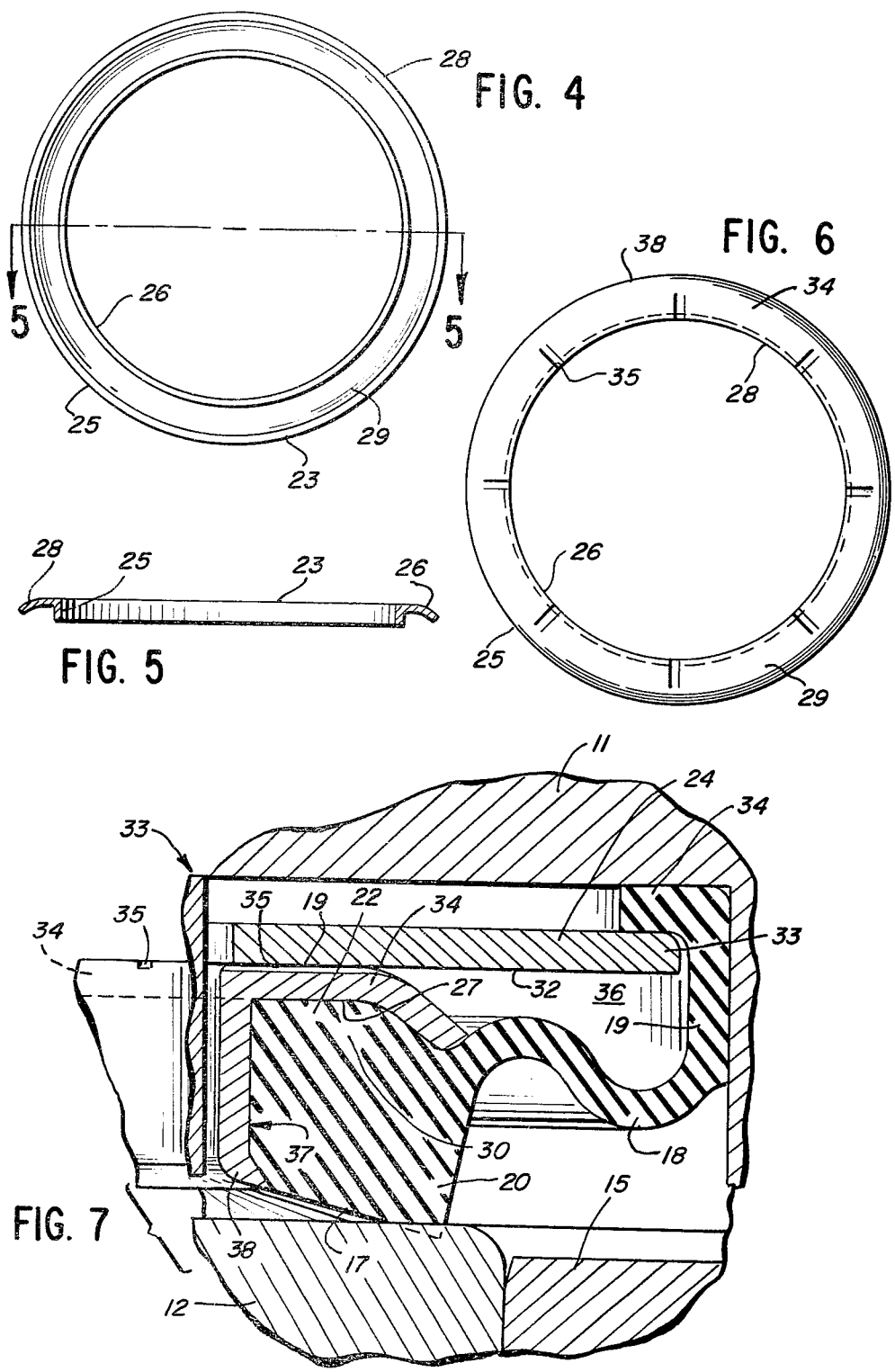

4,251,082

JOINT SEAL HAVING FORCE TRANSFER RING

DESCRIPTION

1. Technical Field

This invention relates to seals and in particular to seals for joints having members relatively movable toward and from each other.

2. Background Art

One improved form of seal for use in a joint having joint members relatively movable toward and from each other is illustrated in U.S. Pat. No. 3,614,113 of Duane L. Burk, which patent is owned by the assignee hereof. As disclosed in that patent, the joint comprises a track link joint such as used in tractors and similar vehicles. The link members of such a joint are pinned together for articulated movement of the track and it is desirable to provide a seal between two of the relatively movable joint members to maintain lubricant within the joint for reduced maintenance and long life of the track structure. In the Burk patent, the seal comprises a resilient boot encompassing the outer diameter of a pair of Belleville type frustoconical springs. The springs are positioned back-to-back and bias the ends of the boot into sealing engagement with the opposed relatively movable joint members.

A further improved joint seal is illustrated in U.S. Pat. No. 3,841,718 of Harold L. Reinsma, which patent is also owned by the assignee hereof. As disclosed therein, the seal utilizes a crescent-shaped seal ring which is biased into sealing engagement with the relatively movable joint members by a load ring acting between a driving flange and a sealing flange of the seal ring. The seal ring further includes a thin flexible hinge section connecting the flanges to permit the load ring to effect the desired resilient urging of the flanges.

In another form of joint seal, a stiffener ring is provided within the seal ring. The stiffener ring is bonded to the seal ring. One disadvantage of this structure is the relatively high cost and the possibility that the bonding may fail over the life of the joint seal. Such track joint seals preferably have a useful life of 10,000 hours or more, while being subjected to rigorous environments.

DISCLOSURE OF INVENTION

The present invention comprehends an improved sealing structure for use in a joint having relatively movable first and second joint members including a seal element having a flexible mounting portion carried by the first joint member, a sealing lip portion carried by the mounting portion to have engagement with the second joint member, and a corner portion generally opposite said lip portion, a force transfer member embracing the corner portion of the element, and a spring acting between the first member and the force transfer portion for mechanically maintaining the force transfer member in embracing association with the corner portion and applying a biasing force to the lip portion to effect a dynamic sealing engagement of the lip portion with the second joint member over the range of variable spacing between the joint members.

In the illustrated embodiment, the force transfer member defines an L-shaped cross section and is preferably formed as a rigid annular member.

The force transfer member is maintained in engagement with the corner portion of the seal element solely by the action of the spring thereagainst.

In the illustrated embodiment, the force transfer member includes a portion aligned with the lip portion of the seal element.

In the illustrated embodiment, the spring comprises a Belleville spring.

The force transfer member, in the illustrated embodiment, has a rounded surface engaged by the Belleville spring so as to have planar facial engagement in a midportion of the movement of the seal elements.

The seal element, in the illustrated embodiment, includes a base portion.

As illustrated, the spring may extend between the base portion and the force transfer member.

The force transfer member, in the illustrated embodiment, defines a concave surface engaging the engagement portion of the seal element.

The force transfer member, in the illustrated embodiment, includes an annular flange with the engagement portion of the seal element defining a recess receiving the flange.

In the illustrated embodiment, the force transfer member further defines a turned end opposite the flange and cooperating therewith to define the concave recess.

The turned end of the force transfer member, in the illustrated embodiment, is directly aligned with the lip portion of the seal element.

Thus, the force transfer member effectively defines a formed stiffener ring which is disposed between the Belleville biasing spring and the seal element lip portion for transferring the spring force to the lip portion against the relatively movable joint member. The stiffener ring is retained in association with the seal element without bonding and, thus, provides a long, troublefree life in the joint seal while yet assuring effective transfer of the spring biasing force to the seal lip portion over the entire range of movement between the joint members.

BRIEF DESCRIPTION OF THE DRAWING

FIG. 4 is an end view of the force transfer stiffener ring;

FIG. 5 is a diametric section taken substantially along the line 5—5 of FIG. 4;

FIG. 6 is an end view of a modified form of force transfer stiffener ring; and

FIG. 7 is a fragmentary diametric section of a portion of a track joint having the modified force transfer stiffener of FIG. 6.

BEST MODE FOR CARRYING OUT THE INVENTION

Figure 1:
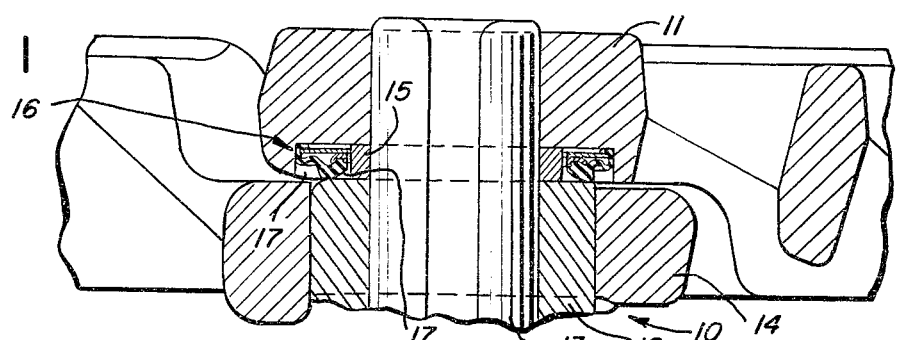
FIG. 1 is a fragmentary diametric section of a track joint having an improved seal embodying the invention.

In the illustrated embodiments of the invention as disclosed in the drawing, a joint generally designated 10 illustratively comprises an articulated joint for use in the track of a tractor-type vehicle or the like. The track may include a first joint member 11 which may comprise one of the links of the track and a second joint member 12 which may illustratively comprise a bushing receiving the track pin 13 and swingably mounting a second link 14 of the track. A thrust ring 15 may be provided between the joint members 11 and 12 for limiting the axial movement of the joint members toward each other in the normal operation of the track.

The invention comprehends the provision of an improved sealing structure 16 for providing a seal between the joint members 11 and 12 across the variable space 17 therebetween.

Figure 2:
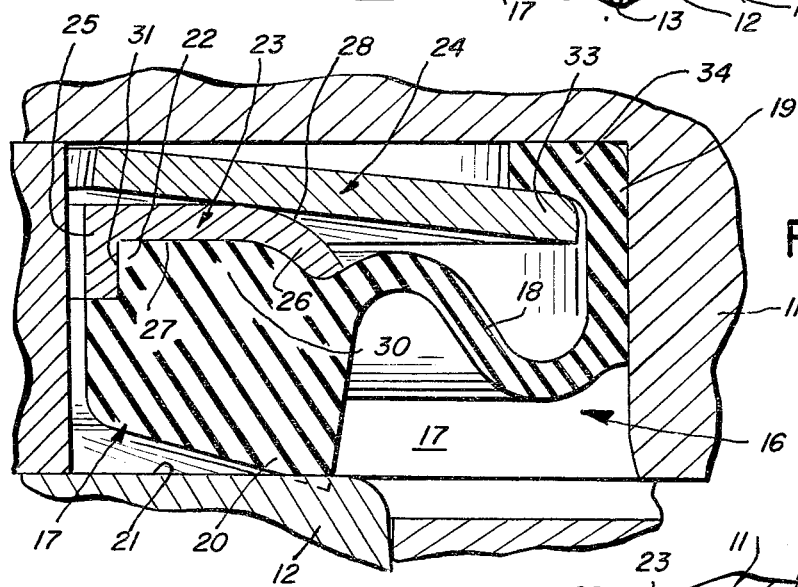
FIG. 2 is a fragmentary enlarged diametric section of a portion thereof.

As shown in FIG. 2, sealing structure 16 includes a seal element generally designated 17 having a flexible mounting portion 18 having a base portion 19 carried by the first joint member 11.

The seal element further includes a lip portion 20 carried by the mounting portion to have engagement with a sealing surface 21 of the second joint member 12.

The seal element further defines a corner portion 22 which is disposed axially oppositely of the lip portion 20. Thus, as shown in FIG. 2, the lip portion 20 may define an axially inner portion of the seal element with the corner portion 22 defining an axially outer portion thereof.

The invention further comprehends the provision of a force transfer member generally designated 23 embracing the corner portion 22 of the seal element.

As further illustrated in FIG. 2, sealing structure 16 further includes a spring generally designated 24 which acts between the first joint member 11 and the force transfer member 23 for both mechanically maintaining the force transfer member in embracing association with the corner portion of the seal element 17 and for applying a biasing force to the lip portion 20 of the seal element to effect a dynamic sealing engagement of lip portion 20 with the sealing surface 21 of second joint member 12 over the entire range of variable spacing between the joint members 11 and 12.

In the embodiment of FIGS. 1–5, the force transfer member comprises a rigid stiffener ring which, as shown in FIG. 2, may define an L-shaped cross section. More specifically, the stiffener ring may include a radially inner turned flange 25 and a radially outer inturned end 26 defining therebetween axially inwardly opening recess 27. As shown in FIG. 2, the turned end 26 is axially aligned with the seal lip portion 20 in the assembled relationship of the joint element.

The turned end 26 effectively defines a rounded axially outer surface 28 which is engaged by the spring 24 in an axially outer disposition of the seal structure, as shown in FIG. 2.

Figure 3:
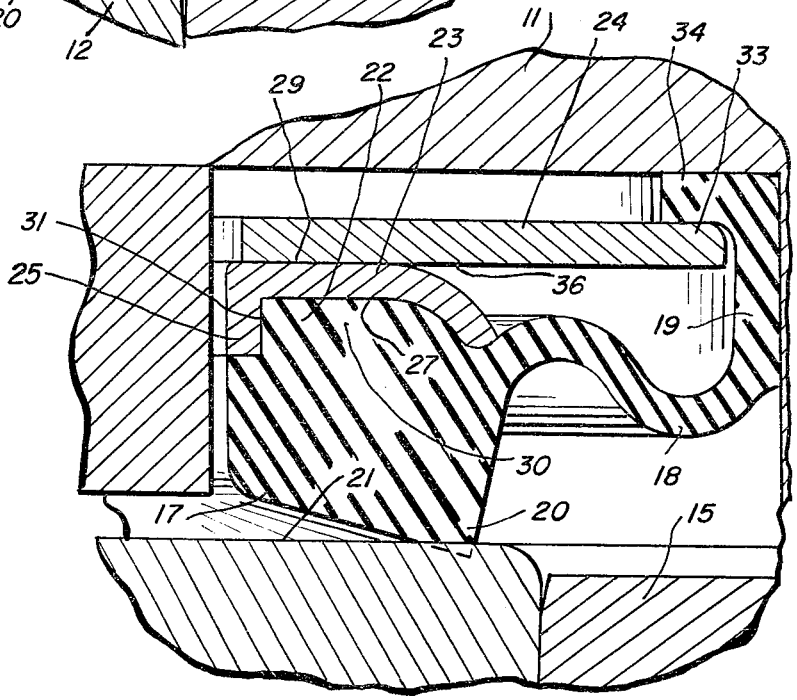
FIG. 3 is a view similar to that of FIG. 2 but illustrating the joint as arranged at a midportion of the relative movement between the joint members.

As illustrated in FIG. 3, the stiffener ring 23 further defines a planar outer surface 29 which is facially engaged by the spring 24 in an intermediate disposition of the seal elements. As illustrated in FIGS. 2 and 3, the action of the spring 24 against the force transfer member causes the force transfer member to forcibly engage an engagement portion 30 of the seal effectively received within the recess 27 of the force transfer member, thereby to provide a stable force transfer between the biasing spring 24 and the sealing lip 20.

As further illustrated, the engagement portion 30 may define an axially outer, radially inwardly opening recess 31 which receives the flange 25 of the force transfer member for providing further improved mechanical retention of the force transfer member, or stiffener ring 23, in association with the seal element 17.

In the illustrated embodiments, spring 24 comprises a frustoconical Belleville spring having an axially inner planar surface 32 engaging the axially outer surfaces of the force transfer member. The spring may further include a radially outer portion 33 engaging a turned flange 34 of the seal element base portion 19, thereby providing a positive effective static seal of the seal element 17 to the first joint member 11.

Flexible portion 18 of the seal element provides facilitated axial movement, including ocillating movement, of the seal lip portion 20 in following the movement of the joint member 12 toward and from joint member 11.

Referring now to the embodiment of FIGS. 6 and 7, a modified form of joint generally designated 33 is shown to comprise a joint generally similar to joint 10 but having a modified form of force transfer stiffener member 34. Force transfer member 34 is generally similar to force transfer member 23 but is provided with a plurality of radially inwardly, axially extending grooves 35 arranged to provide fluid flow passages for relieving pressure in the space 36 enclosed between the spring 24 and the force transfer member, as shown in FIG. 7. Thus, the flexible portion 18 of the seal element is maintained free to flex to provide the desired maintained seal with the joint member 12 at all times.

As shown in FIG. 6, a plurality of such grooves 35 may be provide equiangularly spaced about the inner circumference of the force transfer member.

As further shown in FIG. 7, the radial portion of the force transfer member 34 effectively defines a U-section portion 37 which terminates in a re-turned distal flange 38 for effectively assuring that the force transfer member is maintained in embracing relationship with the seal element 17 notwithstanding rapid axial movement of the lip 20.

As will be obvious to those skilled in the art, the different embodiments may be utilized as desired individually or in combination. Other than as discussed above, each of the embodiments is similar to and functions in a similar manner as the other embodiments.

INDUSTRIAL APPLICABILITY

The joint sealing structure of the present invention may be utilized advantageously in a wide range of joint applications in addition to the track joint embodiment discussed above, as will be obvious to those skilled in the art.

The invention comprehends the provision of such a joint seal which is advantageously adapted for maintaining an effective seal between relatively movable joint members. The use of a stiffener ring in the form of the force transfer member 23 provides an improved transfer of the biasing force from the Belleville spring 24 to the sealng lip portion 20 for effectively maintaining the dynamic seal notwithstanding a substantial range of movement between the joint members.

As a result of the high flexibility of connecting portion 18 of the seal element, the sealing lip portion may be effectively maintained in sealing engagement with the joint member sealing surface 21 with effectively minimized radial movement therebetween, thereby providing a long, troublefree life of the seal.

As the spring biasing force is distributed over a wide area of the seal element, an improved transfer of the biasing force to the lip portion 20 is effected.

As discussed above, the force transfer member includes an inturned, radially outer portion 26 which is effectively axially aligned with the lip portion to provide a positive direct biasing of the lip portion against the joint member sealing surface 21 at all times.

The stiffener ring element defined by the force transfer member 23 may be maintained in association with the seal element without the need for any bonding or other securing means as a result of the effectively mechanically interlocked facial engagement between the stiffener ring and the seal element. The cooperating flange 25 and turned end portion 26 of the stiffener ring effectively positively position the stiffener ring relative to the seal element and the maintained biasing force of spring 24 against the stiffener ring effectively maintains the stiffener ring in embracing relationship to the corner portion 22 of the seal element at all times over the entire range of movement of the joint members.

The joint sealing structures of the illustrated embodiments are extremely simple and economical of construction while yet providing the highly improved low maintenance, long life seal between the movable joint members and, thus, is advantageously adapted for use in applications requiring extended useful life of the joint notwithstanding the use thereof in rigorous and inimical environments.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a joint (10) having a first member (11) and a second member (12) variably spaced from said first member, improved sealing structure (16) for providing a seal between said members across the variable space (21) therebetween, said sealing structure comprising:
   a seal element (17) having a flexible mounting portion (18) carried by said first joint member, a sealing lip portion (20) carried by the mounting portion (18) to have engagement with said second joint member (12), and a corner portion (22) generally opposite said lip portion (20);
   a force transfer member (23) embracing said corner portion (22) of the seal element; and
   a spring (24) acting between said first member (11) and said force transfer member (23) for mechanically maintaining said force transfer member (23) in embracing association with said corner portion (22) and applying a biasing force to said lip portion (20) to effect dynamic sealing engagement of said lip portion (20) with said second joint member (12) over the range of variable spacing between said joint members (11,12).

2. The joint of claim 1 wherein said force transfer member (23) defines an L-shaped cross section.

3. The joint of claim 1 wherein said force transfer member (23) comprises a rigid annular member.

4. The joint of claim 1 wherein said force transfer member (23) is maintained in engagement with said corner portion (22) solely by the action of said spring (24) thereagainst.

5. The joint of claim 1 wherein said force transfer member (23) includes a portion (26) aligned with said lip portion (20).

6. The joint of claim 1 wherein said spring (24) comprises a Belleville spring and said force transfer member (23) defines a rounded surface (28) engaged by said spring (24).

7. In a joint (10) having a first member (11) and a second member (12) variably spaced from said first member, improved sealing structure (16) for providing a seal between said members across the variable space (21) therebetween, said sealing structure comprising:
   a seal element (17) having a flexible mounting portion (18) carried by said first joint member, a sealing lip portion (20) carried by the mounting portion (18) to have engagement with said second joint member (12), and an engagement portion (30) generally opposite said lip portion;
   a rigid force transfer member (23) engaging said engagement portion (30) of the seal element; and
   a spring (24) acting between said first member (11) and said force transfer member (23) for urging said force transfer member (23) into engagement with said engagement portion (30) of the seal element (17) and applying a biasing force to said lip portion (20) thereof to effect dynamic sealing engagement of said lip portion (20) with said second joint member (12) over the range of variable spacing between said joint members (11,12).

8. The joint of claim 7 wherein said spring (24) comprises a Belleville spring.

9. The joint of claim 7 wherein said seal element includes a base portion (19), said spring (24) extending between said base portion (19) and said force transfer member (23).

10. The joint of claim 7 wherein said force transfer member (23) defines a concave surface (27) engaging the engagement portion (30) of the seal element.

11. The joint of claim 7 wherein said force transfer member (23) includes an annular flange (25) and said engagement portion (30) defines a recess (31) receiving said flange (25).

12. The joint of claim 7 wherein said force transfer member (23) includes an annular flange (25) and said engagement portion (30) defines a recess (31) receiving said flange (25), said force transfer member (23) further defining a turned end (26) opposite said flange (25) whereby said force transfer member (23) defines a concave surface (27) engaging the engagement portion (30) of the seal element.

13. The joint of claim 7 wherein said force transfer member (23) includes an annular flange (25) and said engagement portion (30) defines a recess (31) receiving said flange (25), said force transfer member (23) further defining a turned end (26) opposite said flange (25) whereby said force transfer member (23) defines a concave surface (27) engaging the engagement portion (30) of the seal element, said turned end (26) being directly aligned with said lip portion (20) of the seal element (17).

14. The joint of claim 7 wherein said spring (24) and force transfer means (23) define planar surfaces 29,32 in facial engagement at a midportion of the range of deflection of said spring (24).

15. In a joint (33) having a first member (11) and a second member (12) variably spaced from said first member, improved sealing structure (16) for providing a seal between said members across the variable space (21) therebetween, said sealing structure comprising:
   a seal element (17) having a flexible mounting portion (18) carried by said first joint member, a sealing lip portion (20) carried by the mounting portion (18) to have engagement with said second joint member (12), and a corner portion (22) generally opposite said lip portion (20);
   a force transfer member (34) embracing said corner portion (22) of the seal element and having a spring seat portion (30); and
   a spring (24) acting between said first member (11) and said force transfer member spring seat portion (30) for mechanically maintaining said force transfer member (34) in embracing association with said corner portion (22) and applying a biasing force to said lip portion (20) to effect dynamic sealing engagement of said lip portion (20) with said second joint member (12) over the range of variable spacing between said joint members (11,12), said spring seat portion (30) defining a plurality of pressure relief fluid flow passages (35) for conducting trapped lubricant fluid outwardly from between said spring (24) and said spring seat portion (30).

16. The joint of claim 15 wherein said spring seat portion (30) defines a plurality of grooves forming said fluid flow passages (35).

17. The joint of claim 15 wherein said spring seat portion (30) defines a plurality of grooves opening transversely toward said spring (24) and forming said fluid flow passages (35).

18. The joint of claim 15 wherein said spring seat portion (30) defines a plurality of grooves opening transversely toward said spring (24) and forming said fluid flow passages (35), said grooves being spaced equiangularly about the axis of said force transfer member (34).

19. In a joint (33) having a first member (11) and a second member (12) variably spaced from said first member, improved sealing structure (16) for providing a seal between said members across the variable space (21) therebetween, said sealing structure comprising:

a seal element (17) having a flexible mounting portion (18) carried by said first joint member, a sealing lip portion (20) carried by the mounting portion (18) to have engagement with said second joint member (12), and a corner portion (22) generally opposite said lip portion (20);

a force transfer member (34) having a U-section portion (37) receiving said corner portion (22) of the seal element; and a spring (24) acting between said first member (11) and said force transfer member (34) for mechanically maintaining said force transfer member (34) in embracing association with said corner portion (22) and applying a biasing force to said lip portion (20) to effect dynamic sealing engagement of said lip portion (20) with said second joint member (12) over the range of variable spacing between said joint members (11,12).

20. The joint of claim 19 wherein said U-section portion includes a turned flange (25) and a returned distal flange (38).

21. The joint of claim 19 wherein said U-section portion includes a turned flange (25) and a frustoconical re-turned distal flange (38).

22. The joint of claim 19 wherein said force transfer member (34) includes a spring seat portion (30) defining a plurality of pressure relief fluid flow passages (35) for conducting trapped lubricant fluid outwardly from between said spring (24) and said spring seat portion (30).

* * * * *

UNITED STATES PATENT AND TRADEMARK OFFICE
CERTIFICATE OF CORRECTION

PATENT NO. : 4,251,082
DATED : February 17, 1981
INVENTOR(S) : WILLIAM E. LITTLE It is certified that error appears in the above-identified patent and that said Letters Patent are hereby corrected as shown below:

Column 5, line 29 (Cl. 1, line 5), before "therebetween" cancel "(21)" and substitute therefor --(39)--;

line 66 (Cl. 7, line 5), before "therebetween" cancel "(21)" and substitute therefor --(39)--.

Column 6, line 55 (Cl. 15, line 5, before "therebetween" cancel "(21)" and substitute therefor --(39)--

Column 7, line 27 (Cl. 19, line 5), before "therebetween" cancel "(21)" and substitute therefor --(39)--.

Signed and Sealed this

Twenty-second Day of September 1981

[SEAL]

*Attest:*

*Attesting Officer*

GERALD J. MOSSINGHOFF

*Commissioner of Patents and Trademarks*